June 18, 1968 A. R. HARM ET AL 3,388,526
SEALING JAWS

Filed Sept. 17, 1964 5 Sheets-Sheet 2

INVENTORS
Alson R. Harm
Virgil E. Gex
BY
*Fredrich H. Braun*
ATTORNEY

INVENTORS
Alson R. Harm
Virgil E. Gex

BY Fredrick H. Braun

ATTORNEY

INVENTORS
Alson R. Harm
Virgil E. Gex

BY Fredrick H. Braun

ATTORNEY

United States Patent Office 3,388,526
Patented June 18, 1968

3,388,526
SEALING JAWS
Alson R. Harm, Springfield Township, Hamilton County, and Virgil E. Gex, Wyoming, Ohio, assignors to The Procter & Gamble Company, Cincinnati, Ohio, a corporation of Ohio
Filed Sept. 17, 1964, Ser. No. 397,163
5 Claims. (Cl. 53—182)

This invention relates to sealing jaws for a continuous packaging machine. More particularly, the invention is directed to a sealing jaw arrangement designed to clamp and sever a continuously moving tube of packaging material at spaced intervals to form individual packages. The sealing jaws are designed to eliminate slack material so that the finished package is tightly wrapped.

In the packaging art, it is well known to provide a machine of the general type in which a web of heat-sealable thermoplastic film material is moved forward and continuously formed around articles being fed to the machine and being moved forward thereon. In machines of this type, the articles are enveloped in the film as they move forward whereupon a continuous longitudinal seam is formed on the overlapped edge portions of the wrapping material. Thereafter, the elongated tube containing spaced articles therein is moved forward to a sealing jaw station where individual packages are made by severing and sealing at spaced intervals between the articles or objects to be retained in the packages. Heretofore, the sealing operation was carried out by individual pairs of sealing jaws. While a satisfactory seal was obtained, the prior art jaws did not eliminate slack material caused by film stretching, size variations in the articles being packaged or the compressibility of the articles being packaged. As a consequence, it has not been possible to form packages having a taut wrapper in reasonably consistent fashion when operating at the high speeds normally encountered in commercial practice.

The principal object of this invention is to obviate the above difficulties.

Another object of the invention is the provision of sealing jaws for a packaging machine which will sever and seal packages from an elongated tube in such a way that the packaged articles are sealed in a very taut, skin-tight package.

A further object of the invention is the provision of a sealing jaw structure which will consistently form tightly wrapped packages regardless of size variations in the articles being packaged or in the compressibility of such articles.

The nature and substance of the invention can be summarized briefly as comprising a sealing jaw arrangement for a continuous packaging machine of the type in which articles are moved forward within a tube for sealing and severance at spaced intervals between the articles. A plurality of pairs of opposed sealing members are secured to opposed endless conveyors and are moved into closed relation between adjoining articles which are to have separate wrappers formed around them. Each pair of opposed sealing members consists of two sets of mating sealing jaws comprising a first and second set. The sealing jaw sets of the sealing members come together in contiguous relationship on the elongated tubular wrapper material between an article or a plurality of articles to be separately packaged. The second set of sealing jaws of each pair of opposed sealing members is mounted for lateral movement with respect to the first of sealing jaws. After both sets of sealing jaw members are moved together, the second set of sealing jaws are moved laterally with respect to the first set to take up any accumulated slack in the wrapping material and to draw the wrapping material tightly around the immediately adjoining packages being formed. After the wrapping material is formed snugly around the articles, a hot wire mounted in association with each set of sealing jaws is moved through the wrapper material to seal and sever the wrapping material at spaced parallel intervals thereby completing the leading package of the pair and simultaneously forming an end seam for the next succeeding package.

While the specification concludes with claims particularly pointing out and distinctly claiming the subject matter regarded as forming the present invention, it is believed the invention will be better understood from the following description taken in connection with the accompanying drawings in which:

In the discussion of the present invention the sealing jaw mechanism will be described in relation to its application in forming packages for toilet tissue rolls wherein each package contains two rolls of toilet tissue paper. This has been found to be a very useful application of the invention since it is adapted to compensate for size variations which normally occur in this type of article and also because of the compressibility of a roll of toilet tissue paper. These characteristics of toilet tissue rolls make it particularly desirable to provide a sealing device which will take up slack material so that a taut and neat appearing package is formed. It will be understood, of course, that the invention has utility in the packaging of other articles and that the toilet tissue packages are described herein merely to serve as an example of the invention's utility.

Figure 1:
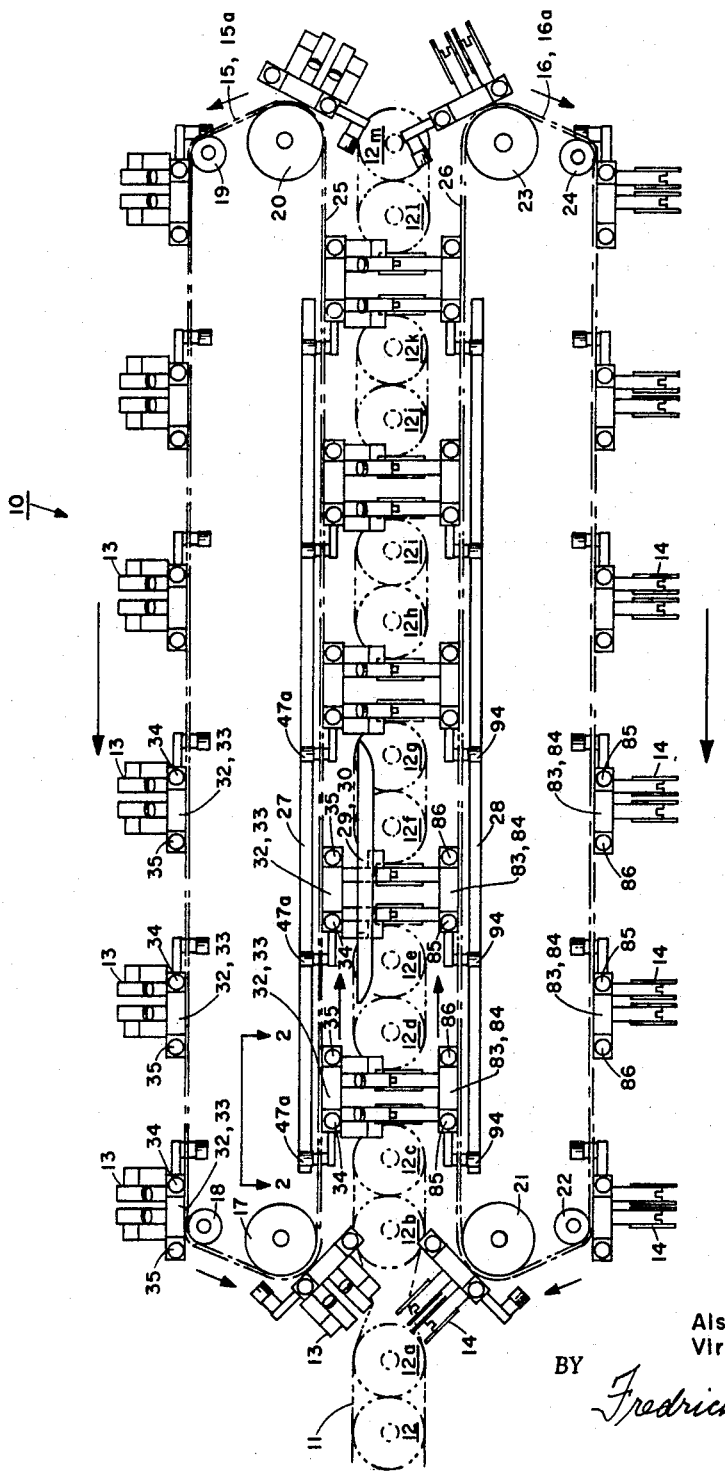
FIGURE 1 is a side elevation of the end sealing portion of a packaging machine incorporating the sealing jaw mechanism of this invention and showing the articles enclosed in a tube of packaging material being received at one end and being moved through the machine as the packages are completed.

Making reference now to the drawings, FIGURE 1 illustrates the essential elements of the end sealing portion of a packing machine of the type described in greater detail in the copending application of Alson R. Harm, Ser. No. 347,884, filed Feb. 27, 1964, now Patent No. 3,303,630, entitled Packaging Apparatus and Method for Cylindrical Articles, said application being commonly owned by the assignee of the present application. For clarity of illustration, the details of the structural support members for the end sealing portion are not shown since they are conventional as will be appreciated by those skilled in the art.

An elongated tube 11 of a heat-sealable thermoplastic packaging material, e.g., polyethylene and like films, is formed around the articles 12, 12a, 12b, etc., shown moving into the sealing portion of the machine at the left end of FIGURE 1. Upper sealing members shown generally at 13 and lower sealing members shown generally at 14 are moved in pairs by the opposed endless conveyors 15 and 16 which may be in the form of endless chains. The endless conveyor 15 is supported by the sprockets 17, 18, 19 and 20 and the endless conveyor 16 is supported by the sprockets 21, 22, 23, and 24. Extending between the sprockets 17, 20 and the sprockets 21, 23 are continuous straight flights of the conveyors 25 and 26, respectively, which extend in opposed relationship. The conveyors 15 and 16 are synchronously driven so that the upper and lower sealing members 13 and 14 will be engaged and come between each pair of toilet tissue rolls 12, 12a; 12b, 12c; etc.

A substantially similar conveyor 15a (FIGURE 3) is spaced from the conveyor 15 and is similarly supported and driven in unison therewith. The conveyor 16a (FIGURE 3) is spaced from the conveyor 16 and is also similarly supported and driven in unison therewith.

Referring to FIGURE 1, spreading cams 27 and 28 are mounted alongside and parallel to the extending flights 25 and 26 of the conveyors 15 and 16, respectively, to function as a spreading means for the sealing jaws as will be more fully explained hereinafter. Similarly, hot wire cut-off cams 29 and 30 (FIGURES 1, 3 and 6) made from an electrically conductive material are mounted on opposite sides of the frame to energize and move the hot wire cut-off means at the appropriate time in the machine cycle.

Figure 3:
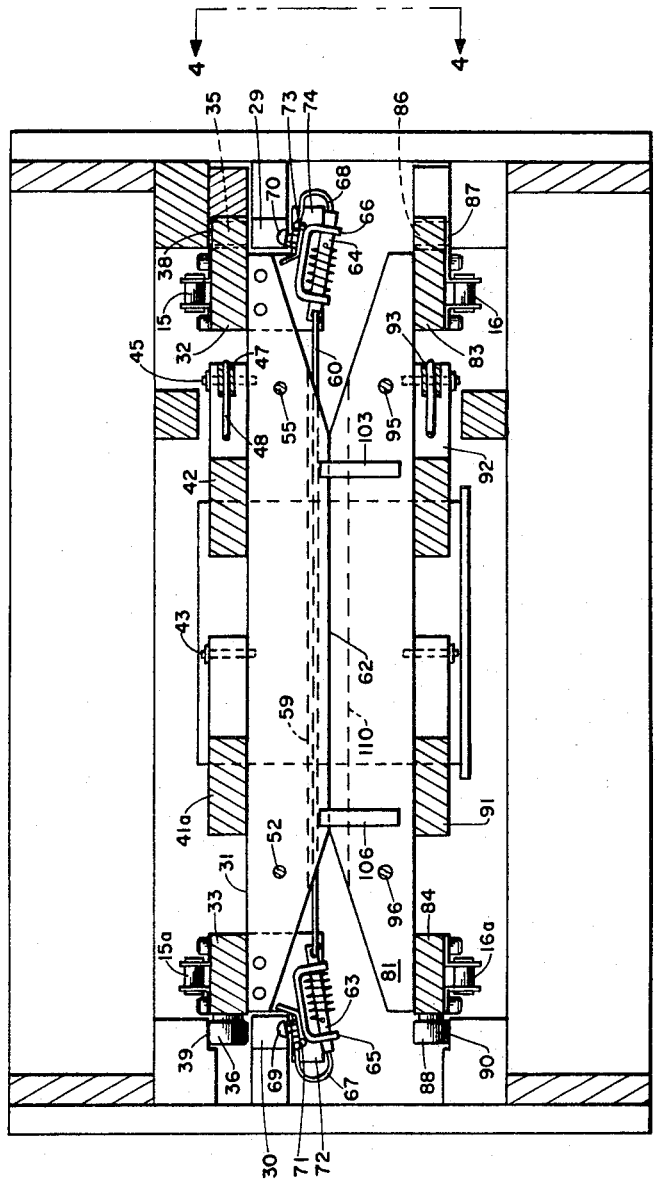
FIGURE 3 is a section taken on the line 3—3 of FIGURE 2 showing one set of sealing jaws with the supporting structure for the sealing members being added as well as the actuating cams and conductors for the cut-off wires.

One set of sealing members consisting of the upper sealing member 13 and the lower sealing member 14 will now be described. It will be understood that each of the sealing members on the upper conveyors 15, 15a and on the lower conveyors 16, 16a of FIGURES 1 and 3 are essentially identical in construction and therefore the detailed description of one will apply to the others.

Figure 2:
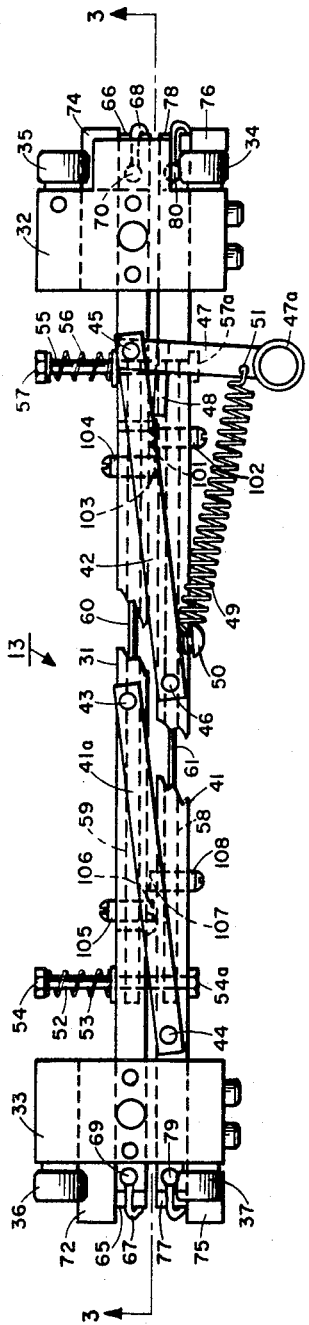
FIGURE 2 is a fragmentary view taken on the line 2—2 of FIGURE 1 showing one upper sealing member with the two pairs of sealing jaws in their closed position.

The upper sealing member 13 shown in FIGURE 2 comprises a primary jaw 31 secured to a pair of carrying members 32 and 33. The carrying member 32 has a pair of free turning rollers 34 and 35 mounted for rotation and extending therefrom and the carrying member 33 has a pair of free turning rollers 36 and 37 extending therefrom as illustrated in FIGURES 2 and 3. The rollers 34 and 35 are mounted for movement on the upper track roller guide 38 which is secured to the frame of the sealing end portion of the machine. Similarly, the rollers 36 and 37 are mounted to move on the track roller guide 39.

A movable secondary jaw 41, similar in structure to the primary jaw 31, is provided in the upper sealing member 13. The secondary jaw 41 is supported and suspended from the primary jaw 31 by the connecting link members 41a and 42. The connecting link members are pinned as at 43, 44 and 45, 46 to permit the primary jaw 31 and the secondary jaw 41 to be moved laterally in parallel relation with respect to one another. An arm 47 having a roller follower 47a at one end is pivotally mounted on the pin 45 and a stop 48 is provided which normally bears against the connecting link member 42 because of the tension in the spring 49. The spring 49 is connected at one end to a pin 50 secured to the link member 42. The other end of the spring 49 is always in tension and normally maintains the arm 47 in the position illustrated in FIGURE 2 (this being hereinafter referred to as the close position since the jaws 31 and 41 are in close together relationship). The function of the spring 49 is to allow the arm 47 to be pivoted a fixed amount when the follower 47a engages the spreading cam 27 (FIGURE 1) regardless of the relative movement of the secondary jaw 41 with respect to the primary jaw 31 since the relative movement of the jaws will vary due to dimensional differences in adjoining packages in each machine cycle.

Figure 5:
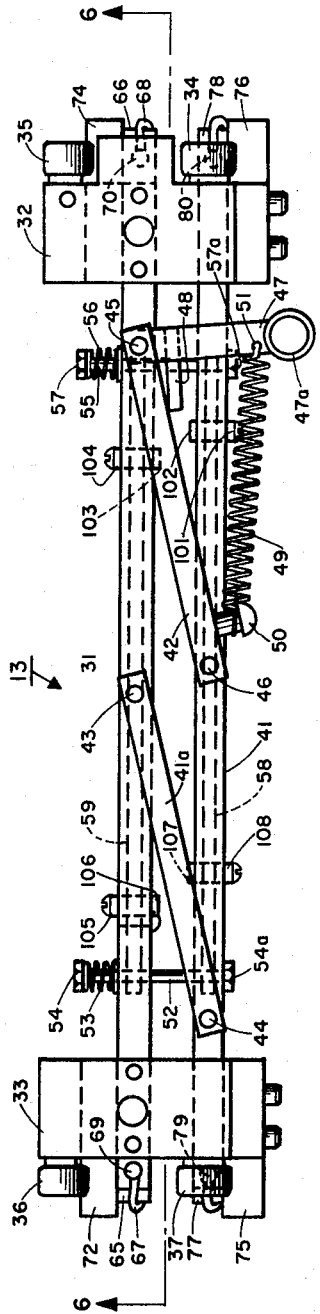
FIGURE 5 is a view similar to FIGURE 2 except that the two pairs of sealing jaws are shown in spread position.

Jaw guide and return means are provided as shown in FIGURES 2 and 5. These means include a loosely mounted pin member 52 having a spring 53 interposed between its head 54 and the side of the primary jaw 31. The head 54a prevents pin member 52 from passing through the aperture in the secondary jaw 41. Similarly, the pin member 55 has a spring 56 interposed between its head 57 and one side of the primary jaw 31. The head 57a prevents the pin member 55 from passing through the aperture in the secondary jaw 41. The pin members 52 and 55 together with the springs 53 and 56 tend to maintain the jaws in the close position. Reliatively large openings are provided for passage of the pin members 52 and 55 through the jaws 31 and 41 to allow for relative lateral movement of the jaws as they are moved from the close position to the spread position without interference from the pin members 52 and 55.

The lower portion of the jaws 31 and 41 are slotted as at 58 and 59 (FIGURE 2) to receive the heat sealing wires 60 and 61 so that normally they will be suspended above the bottom horizontal surface of the jaws 31 and 41 as defined by the line 62 (FIGURE 3). The ends of the heat sealing wire 60 are joined to the pins 63 and 64 which are movable in the brackets 65 and 66. Springs 65a and 66a maintain tension in the wire 60. Conductors 67 and 68 are attached to the pins 63 and 64, respectively, at one end. The conductors 67 and 68 are attached to the contact pins 69 and 70, respectively, at the other end. The contact pins 69 and 70 are mounted, respectively, on the brackets 65 and 66. The bracket 65 is pivoted at 71 in the insulated block 72 which is secured to the primary jaw 31 (FIGURES 2 and 3). This permits pivotal movement of the bracket 65 by pushing down on the contact pin 69. The bracket 66 is similarly pivoted at 73 to the insulated block 74 which is secured to the primary jaw 31 (FIGURES 2 and 3).

Figure 4:
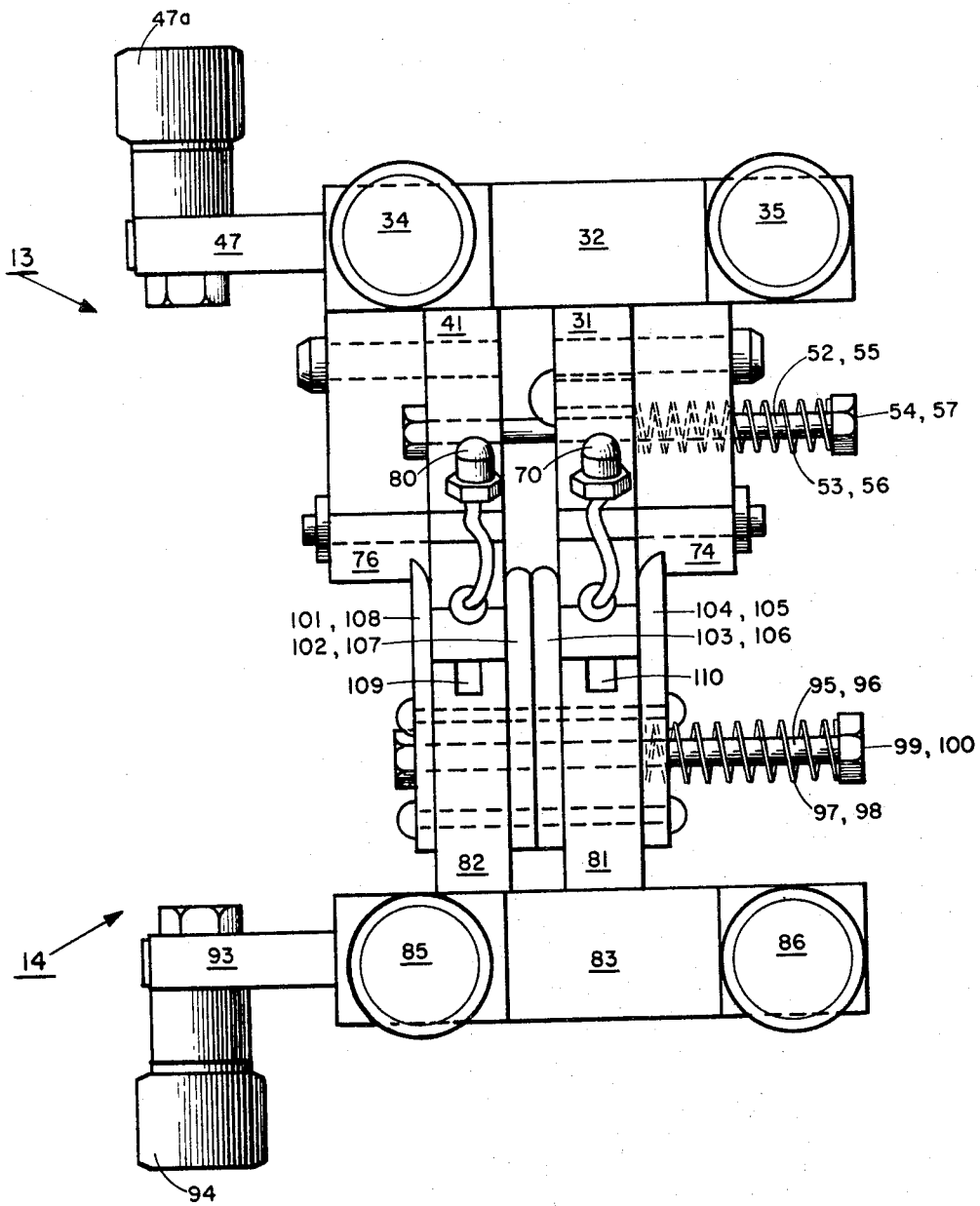
FIGURE 4 is a fragmentary end elevation taken on the line 4—4 of FIGURE 3 showing one complete set of upper and lower sealing members when engaged between adjoining packages in closed position with the structural elements of FIGURE 3 removed.

The wire 61 in the slot 58 of the secondary jaw 41 is supported in identical fashion to the wire 60 as described in the preceding paragraph. As shown in FIGURE 2, the electrically insulated blocks 75 and 76 are attached to the secondary jaw 41 (see FIGURE 4 showing the attachment of the insulating block 76 to the secondary jaw 41). Brackets 77 and 78 are pivoted to the insulating blocks 75 and 76, respectively. The conductors, pins and springs for supporting and energizing the wire 61 are identically constructed (although all the details are not shown) as the conductors 67, 68; the pins 63, 64; and the springs 65a, 66a used to support and energize the wire 60. In other words, the support and energizing structure for the wires 60 and 61 are substantially identical except that the electrically insulated blocks 72 and 74 are secured to the primary jaw 31 and the electrically insulated blocks 75 and 76 are secured to the secondary jaw 41.

The lower sealing member 14 as seen in FIGURE 4 comprises a primary lower jaw 81 and a movable secondary jaw 82. Mechanism is provided for moving the secondary lower jaw 82 laterally with respect to the primary lower jaw 81. This mechanism is essentially identical to the mechanism heretofore described in connection with the upper jaws 31 and 41 as illustrated in FIGURE 2. As shown in FIGURES 1 and 3, this mechanism includes the carrying members 83 and 84. Carrying member 83 has free turning rollers 85 and 86 which ride on the support guide 87 supported by the frame as shown. Similarly, carrying member 84 has two free turning rollers, the roller 88 being shown in FIGURE 3; the other roller (not shown) is mounted in tandem with the roller 88. The rollers on carrying member 84 are supported on the support guide 90 which is also attached to the frame. The connecting link members are shown at 91 and 92 in FIGURE 3. The link members 91 and 92 are pinned in identical fashion to the connecting link members 41a and 42 used for the upper jaws 31 and 41.

Referring now to FIGURE 4, an arm 93 having a roller 94 extending therefrom is mounted with respect to the lower jaws 81 and 82 just as the arm 47 is attached to the upper jaws. When actuated by the spreading cam 28 (FIGURE 1), the arm 93 functions in the same way and for the same purpose as the arm 47. In addition, spaced pin members 95 and 96 urged outwardly by the springs 97 and 98 bearing against the heads 99 and 100, respectively, are provided to normally assist in maintaining the lower jaws in the close position and also to return them to the close position after they have been spread.

The primary upper jaw 31 and the primary lower jaw 81 provide a first set of sealing jaws; the secondary upper jaw 41 and the secondary lower jaw 82 provide a second set of sealing jaws. Guide members 101, 102, 103, 104, 105, 106, 107 and 108 are attached to the lower jaws as best seen in FIGURES 2 and 4 in order to maintain alignment between the first and second sets of sealing jaws when in closed relation. The lower sealing jaws 81 and 82 are slotted at 109 and 110 to allow clearance for the sealing wires 60 and 61 when cutting through and sealing the packaging material.

The upper and lower sealing members 13 and 14 come together as shown in FIGURE 1 at spaced intervals between adjoining articles to be encased in packages. They are initially in the close position illustrated in FIGURE 4.

In the close position, the first set of sealing jaws 31 and 81 come together in contiguous relationship on the wrapper material as do the second set of sealing jaws 41 and 82. As the sealing jaw assemblage is moved forward in the machine, the upper roller 47a and the lower roller 94 engage the spreader cams 27 and 28, respectively. This causes the arms 47 and 93 to move counterclockwise (as viewed in FIGURE 2) so the jaw pairs 31, 81 and 41, 82 are moved into the spread position illustrated in FIGURE 5 due to the force exerted by the spring 49 and the spring (not shown) which serves a similar function on the arm 93 for the lower sealing member 14. When the jaws are spread, they take up any slack in the wrapping material encasing the articles of adjoining packages being formed.

Figure 6:
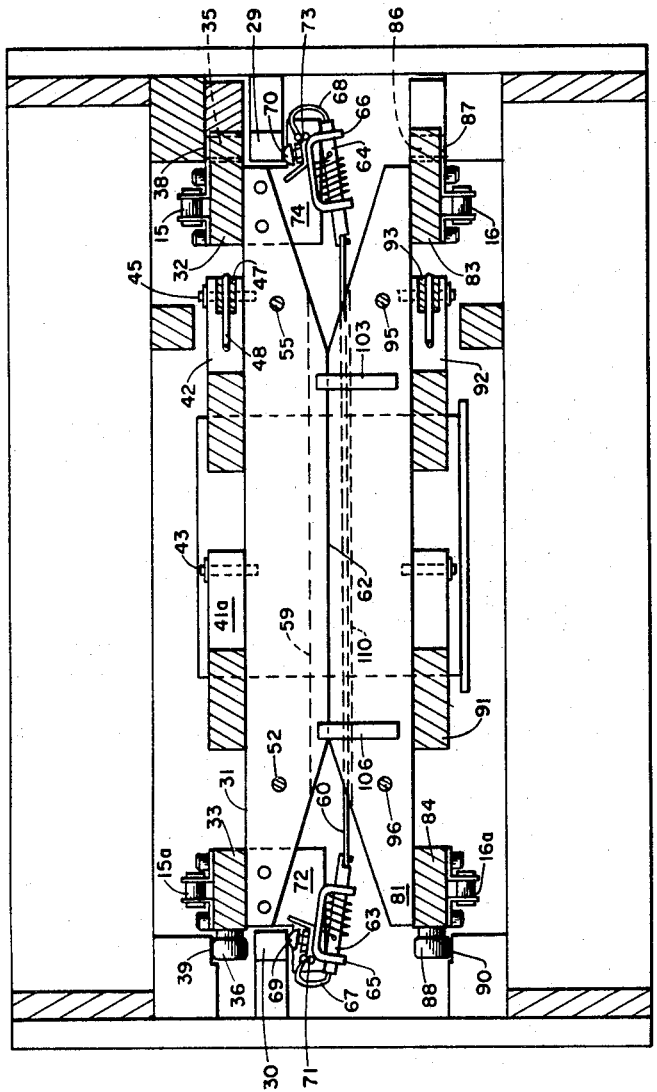
FIGURE 6 is a view similar to FIGURE 3 but taken on line 6—6 of FIGURE 5 with the hot wire cut-off member in its actuated or down position.

As the jaws move along in spread position, the contact pins 69, 70, and 79, 80 engage the conductive hot wire cutoff cams 29 and 30. This causes the wires 60 and 61 to be energized and heated with electrical energy from a conventional source (not shown) connected to the cams 29 and 30. Simultaneously, the cams 29 and 30 push the contact pins 69, 70 and 79, 80 downwardly causing the brackets 65, 66 and 77, 78 to be pivoted so that the wires 60 and 61 pass through the thermoplastic heat-sealable material 11 into the slots 109 and 110. FIGURE 6 illustrates the down position of the wire 60; the wire 61 will be similarly displaced. The movement of the hot wire through the thermoplastic material 11 causes two parallel lines of severance at spaced intervals between the packages being formed and provides the end seam on adjoining packages. As the jaws move beyond the cams 29 and 30 the hot wires 60 and 61 are de-energized and returned to their original position shown in FIGURE 3. On further movement of the upper and lower sealing members 12 and 13, the heat seals solidify and the jaw pairs 31, 81 and 41, 82 are returned to the close position after they have moved beyond the spreader cams 27, 28 so that successive finished packages are discharged from the right end of the sealing jaw unit illustrated in FIGURE 1.

While particular embodiments of the invention have been illustrated and described it will be obvious to those skilled in the art that various changes and modifications can be made without departing from the spirit and scope of the invention and it is intended to cover in the appended claims all such changes and modifications that are within the scope of this invention.

What is claimed as new is:

1. In a machine for sealing a tube-shaped wrapper between articles disposed at spaced intervals therein, the combination comprising upper and lower sealing members, means for moving said upper and lower sealing members into engagement between said articles disposed at spaced intervals, said upper and lower sealing members comprising a first set of sealing jaws and a second set of sealing jaws, means for moving said second set of sealing jaws laterally with respect to said first set of sealing jaws so that said first and second set of sealing jaws are spread apart, said spreading action eliminating slack material from adjoining packages being formed around the articles at spaced intervals in said wrapper, means associated with said first and second set of sealing jaws for severing and sealing the wrapper along two parallel spaced-apart lines, said severing and sealing means comprising a slot formed in one of each of said first and second sets of sealing jaws, a clearance slot in the mating sealing jaw of each of said first and second sets of sealing jaws, a sealing wire normally suspended longitudinally in said first mentioned slot of each set of sealing jaws, and means for moving each of said sealing wires from its original position through the wrapper and into the clearance slot of its mating sealing jaw.

2. A sealing jaw unit as claimed in claim 1 including a plurality of guide members secured to one jaw of each pair to maintain alignment with the mating jaw of the pair when said upper and lower sealing members are moved into engagement.

3. A sealing jaw unit as claimed in claim 2 including connecting link members pinned to the upper jaws and to the lower jaws to maintain said upper and lower jaws in parallel relation when laterally moving said second set of sealing jaws with respect to said first set.

4. A sealing jaw unit comprising a pair of spaced upper carrying members, an upper primary jaw secured to said carrying members, an upper movable secondary jaw closely spaced with respect to said upper primary jaw, upper link members interconnecting said upper primary and upper secondary jaw members, an upper arm extending from and pivoted to said upper primary jaw member, an actuating roller extending from said upper arm, a spring member connected to said upper arm at one end and to one of said upper link members at the other end to spread said upper primary jaw and said upper secondary jaw when said upper arm is pivoted, a pair of spaced lower carrying members, a lower primary jaw secured to said lower carrying members, a lower movable secondary jaw closely spaced with respect to said lower primary jaw, lower link members interconnecting said lower primary and lower secondary jaw members, a lower arm extending from and pivoted to said lower primary jaw member, an actuating roller extending from said lower arm, a spring member connected to said lower arm at one end and to one of said lower link members at the other end to spread said lower primary jaw and said lower secondary jaw when said lower arm is pivoted, means for bringing the upper primary and secondary jaws into engagement with said lower primary and secondary jaws, respectively, to form two pairs of engaged jaws, opposed slots formed in the engaging surfaces of said jaws, and means associated with one jaw of each pair for severing and sealing a heat-sealable thermoplastic material along two parallel, spaced lines.

5. A sealing jaw unit as claimed in claim 4 wherein said severing and sealing means comprises a sealing wire normally suspended longitudinally in one slot of each pair of engaged jaws, and means for moving said sealing wires from a first position through the heat-sealable thermoplastic material and into the slot of the mating sealing jaw.

References Cited

UNITED STATES PATENTS

| 2,524,584 | 10/1950 | Zehr. | |
| 2,915,866 | 12/1959 | Bartlo | 53—180 X |
| 3,052,074 | 9/1962 | Dreeben | 53—182 |
| 3,256,673 | 6/1966 | Tew et al. | 53—182 |
| 3,347,015 | 10/1967 | Nutting et al. | 53—182 |

FOREIGN PATENTS

| 1,329,553 | 5/1963 | France. |

WILLIAM W. DYER, Jr., *Primary Examiner.*

FRANK E. BAILEY, *Examiner.*

N. ABRAMS, *Assistant Examiner.*